US012351683B2

(12) United States Patent
Stanjek et al.

(10) Patent No.: US 12,351,683 B2
(45) Date of Patent: Jul. 8, 2025

(54) METHOD FOR PRODUCING ORGANYLOXYSILANE-TERMINATED POLYMERS

(71) Applicant: Wacker Chemie AG, Munich (DE)

(72) Inventors: Volker Stanjek, Ampfing (DE); Lars Zander, Altötting (DE)

(73) Assignee: Wacker Chemie AG, Munich (DE)

( * ) Notice: Subject to any disclaimer, the term of this patent is extended or adjusted under 35 U.S.C. 154(b) by 665 days.

(21) Appl. No.: 17/778,863

(22) PCT Filed: Dec. 13, 2019

(86) PCT No.: PCT/EP2019/085139
§ 371 (c)(1),
(2) Date: May 23, 2022

(87) PCT Pub. No.: WO2021/115621
PCT Pub. Date: Jun. 17, 2021

(65) Prior Publication Data

US 2022/0396665 A1 Dec. 15, 2022

(51) Int. Cl.
*C08G 65/336* (2006.01)

(52) U.S. Cl.
CPC ....... *C08G 65/336* (2013.01); *C08G 2650/04* (2013.01)

(58) Field of Classification Search
CPC .......................... C08G 65/336; C08G 2650/04
See application file for complete search history.

(56) References Cited

U.S. PATENT DOCUMENTS 8,907,027 B2 * 12/2014 Stanjek .............. C08G 18/4825 525/453
11,773,206 B2 * 10/2023 Stanjek ................ C08G 77/445 528/28
2014/0155545 A1 * 6/2014 Stanjek ................... C08L 89/04 524/588
2021/0309792 A1 * 10/2021 Stanjek ................ C09D 175/08

FOREIGN PATENT DOCUMENTS

| | | | |
|---|---|---|---|
| DE | 102007006147 | A1 | 8/2008 |
| EP | 1535940 | A1 | 6/2005 |
| EP | 3546468 | A1 | 10/2019 |
| WO | 2006136261 | A1 | 12/2006 |
| WO | 2011131506 | A1 | 10/2011 |
| WO | 2013026654 | A1 | 2/2013 |
| WO | 2013079330 | A2 | 6/2013 |

* cited by examiner

*Primary Examiner* — Margaret G Moore

(57) ABSTRACT

A process for preparing silane-terminated polymers (SP) of the formula (I), $$Y—[O—C(=O)—NH—(CR^1_2)_b—SiR_a(OR^2)_{3-a}]_x \quad (I),$$

includes in a 1st process step at least one polymer (OHP) of the formula (II), $$Y—[OH]_x \quad (II),$$

being reacted with at least one isocyanate-functional silane (IS) of the formula (III), $$O=C=N—(CR^1_2)_b—SiR_a(OR^2)_{3-a} \quad (III),$$

with the proviso that the isocyanate-functional silanes (IS) are used in an amount such that there are at least 1.05 isocyanate groups in the silanes (IS) to each hydroxyl group in the compounds (OHP). Subsequently, in a 2nd process step, the unreacted isocyanate groups of the silanes (IS) are reacted, in the reaction mixture obtained in the 1st process step, with at least one alcohol (A) of the formula (IV), $$R^3OH \quad (IV)$$

Subsequently, in a 3rd process step, the reaction mixture obtained in the 2nd process step is passed through an evaporation unit (VD).

8 Claims, No Drawings

METHOD FOR PRODUCING ORGANYLOXYSILANE-TERMINATED POLYMERS

CROSS-REFERENCE TO RELATED APPLICATION

This application is a U.S. National Phase Application of PCT/EP2019/085139, filed Dec. 13, 2019, the contents of which are hereby incorporated by reference in their entirety.

BACKGROUND

The invention relates to a process for preparing organyloxysilane-terminated polymers, and also to the use thereof for producing adhesives and sealants.

Polymer systems which possess reactive alkoxysilyl groups, more particularly silane-terminated polyethers, are long-established systems. On contact with water or atmospheric moisture, these alkoxysilane-terminated polymers are capable even at room temperature of undergoing condensation with one another, with elimination of the alkoxy groups. One of the most important applications of such materials is the production of adhesives, more particularly of elastic adhesive systems.

In the production of commercially available products, three different processes for preparing silane-terminated polymers are of particular importance. All three of these processes, however, are marked out by their own specific disadvantages/problems:

1. The preparation of so-called silane-terminated polyurethanes from polyethers, diisocyanates, and aminoalkyl-functional silanes. A disadvantage of this process is the chain extension that occurs at the same time, since some of the diisocyanates used react by both isocyanate groups with a polyether molecule, forming dimerized polymers with twice the molar mass. This leads to an increase in the polydispersity $M_w/M_n$, with the consequence in turn that the products in question have a comparatively high viscosity relative to their average molar mass $M_n$. High molar masses $M_n$ are critical to achieving excellent mechanical properties in the cured materials (e.g., a high tensile strength in combination with high elongation at break). Low viscosities, conversely, are desirable to maximize the processing properties of the liquid adhesives or sealants. The lack of an option for preparing as far as possible high molecular mass silane-terminated polymers having at the same time an extremely low viscosity is therefore a serious disadvantage.
2. Preparation of silane-terminated polyethers by allylation of the terminal hydroxyl groups therein, with subsequent hydrosilylation of the alkyl chain termini formed in the allylation. A disadvantage of this process is the fact that, in particular, the hydrosilylation does not proceed to completion, thus giving a high fraction of unsilanized chain ends which are therefore not crosslinkable either. This is detrimental to the mechanical properties of the cured adhesives and sealants producible on these polymers.
3. Preparation of silane-terminated polyethers by reaction of terminal hydroxyl groups therein with isocyanatoalkyl-functional alkoxysilanes. This process permits virtually complete chain termination, without accompanying chain extension, and so avoids the disadvantages of the two systems described above. A problem, however, is the fact that the isocyanatoalkyl-functional alkoxysilanes required for this process are highly toxic, it being necessary, therefore, to ensure that they are no longer present in the end product, i.e., in the silane-terminated polymer.

The prior art describes a variety of methods allowing this problem to be solved, and any isocyanate residues in the end product to be avoided. In EP-A 1535940 the reactant ratios are selected such that the isocyanatosilane is fully consumed by reaction under the specific reaction conditions selected. A process of this kind, however, is susceptible to error, with even small metering errors resulting in either excessively metered isocyanatosilane remaining in the silane-terminated polymer, or inadequately metered isocyanatosilane leading to chain ends which are not silanized and therefore not reactive, with the ultimate consequence of insufficiently constant mechanical properties of the adhesives and sealants produced from these polymers.

To solve these problems, EP-A 1896523 proposes preparing the silane-terminated polymers in a continuous process, in which the isocyanatosilane is used in excess and any unreacted isocyanatosilane radicals present are scavenged in a subsequent step with an isocyanate-reactive compound, such as an alcohol or an amine. A disadvantage of this process, however, is the fact that the scavenging product of this reaction, a monomeric urethane-functional and/or urea-functional di- or trialkoxysilane, remains in the reaction mixture and so affects the mechanical properties of the cured end product. Dialkoxysilanes have a plasticizing effect, while trialkoxysilanes increase hardness by virtue of their capacity to increase the network density.

With regard to the end product, i.e., the fully formulated adhesive or sealant, this may in certain cases be desirable, but may equally well also not be desirable.

From the viewpoint of a producer of silane-crosslinking polymers, it would be desirable in any case to be able to provide a product which is largely free from additional monomeric silanes, so that the formulator of an adhesive or sealant receives the maximum possible formulation freedom and is able to decide for themselves whether they wish to add monomeric silanes, and if so which monomeric silanes, to their particular end-use formulation.

It was an object of the invention, therefore, to provide a process for preparing silane-functional polymers which has neither the above-outlined disadvantages of the prior art nor other disadvantages, such as discoloration.

BRIEF SUMMARY

Embodiments of a process for preparing silane-terminated polymers (SP) of the formula (I), $Y\text{-}[O—C(=O)—NH—(CR^1{}_2)_b—SiR_a(OR^2)_{3-a}]_x$ (I), are provided. In an embodiment, the process characterized in that in a $1^{st}$ process step at least one polymer (OHP) of the formula (II), $Y—[OH]_x$ (II), is reacted with at least one isocyanate-functional silane (IS) of the formula (III), $O=C=N\text{-}(CR^1{}_2)_b—SiR_a(OR^2)_{3-a}$(III), with the proviso that the isocyanate-functional silanes (IS) are used in an amount such that there are at least 1.05 isocyanate groups in the silanes (IS) to each hydroxyl group in the compounds (OHP), where Y is an x-valent polymer radical, R may be identical or different and is a monovalent, optionally substituted hydrocarbon radical, $R^1$ may be identical or different and is hydrogen atom or a monovalent, optionally substituted hydrocarbon radical, $R^2$ may be identical or different and is hydrogen atom or a monovalent, optionally substituted hydrocarbon radical, x is an integer from 1 to 50, a may be identical or different and is 0, 1 or 2, and b may be identical or different and is an integer from 1 to 10.

Subsequently in a 2nd process step the unreacted isocyanate groups of the silanes (IS) are reacted, in the reaction mixture obtained in the 1st process step, with at least one alcohol (A) of the formula (IV), $R^3OH$ (IV), where $R^3$ is a hydrocarbon radical having 1 to 4 carbon atoms.

Subsequently in a 3rd process step the reaction mixture obtained in the 2nd process step is passed through an evaporation unit (VD) in which the reaction mixture in a layer thickness of not more than 5 cm is exposed to a pressure of at most 80 mbar and temperatures of at most 200° C., with the carbamatosilane (CS) formed in the 2nd process step, of the formula (V), $R^3O—C(=O)—NH—(CR^1_2)_b—SiR_a(OR^2)_{3-a}$(V), in which all the variables have the definition stated above, being at least partly evaporated and removed.

DETAILED DESCRIPTION

A subject of the invention is a process for preparing silane-terminated polymers (SP) of the formula (I)

$$Y—[O—C(=O)—NH—(CR^1_2)_b—SiR_a(OR^2)_{3-a}]_x \quad (I),$$

characterized in that in a 1st process step at least one polymer (OHP) of the formula (II)

$$Y—[OH]_x \quad (II)$$

is reacted with at least one isocyanate-functional silane (IS) of the formula (III)

$$O=C=N—(CR^1_2)_b—SiR_a(OR^2)_{3-a} \quad (III)$$

with the proviso that the isocyanate-functional silanes (IS) are used in an amount such that there are at least 1.05 isocyanate groups in the silanes (IS) to each hydroxyl group in the compounds (OHP), where Y is an x-valent polymer radical, R may be identical or different and is a monovalent, optionally substituted hydrocarbon radical, $R^1$ may be identical or different and is hydrogen atom or a monovalent, optionally substituted hydrocarbon radical, $R^2$ may be identical or different and is hydrogen atom or a monovalent, optionally substituted hydrocarbon radical, x is an integer from 1 to 50, preferably 1, 2 or 3, more preferably 2, a may be identical or different and is 0, 1 or 2, preferably 0 or 1, and b may be identical or different and is an integer from 1 to 10, preferably 1, 3 or 4, more preferably 1 or 3, more particularly 1, subsequently in a 2nd process step the unreacted isocyanate groups of the silanes (IS) are reacted, in the reaction mixture obtained in the 1st process step, with at least one alcohol (A) of the formula (IV)

$$R^3OH \quad (IV),$$

where $R^3$ is a hydrocarbon radical having 1 to 4 carbon atoms, and subsequently in a 3rd process step the reaction mixture obtained in the 2nd process step is passed through an evaporation unit (VD) in which the reaction mixture in a layer thickness of not more than 5 cm is exposed to a pressure of at most 80 mbar and temperatures of at most 200° C., with the carbamatosilane (CS) formed in the 2nd process step, of the formula (V)

$$R^3O—C(=O)—NH—(CR^1_2)_b—SiR_a(OR^2)_{3-a} \quad (V).$$

in which all the variables have the definition stated above, being at least partly evaporated and removed.

The carbamatosilane content in the reaction mixture obtained after the process of the invention is preferably at most 0.3 wt %, more preferably at most 0.2 wt %, more particularly at most 0.1 wt %, based in each case on the total weight of the reaction mixture.

The carbamatosilane content here is preferably determined by the method described in example 2.

The evaporator unit (VD) used in the invention may comprise any existing evaporator units, such as a thin-film, falling-form or short-path evaporator, which are preferred.

In the 3rd process step of the process of the invention, the preferred layer thickness of the reaction mixture, preferably in the form of a liquid film in the evaporator unit (VD), is preferably not more than 2 cm, more preferably not more than 1 cm, more particularly not more than 0.5 cm, very preferably not more than 0.3 cm.

The carbamatosilane (CS) is in principle highly volatile and may, moreover, enter into hydrogen bonds with the urethane groups of the silane-terminated polymer (SP). It therefore cannot be removed within an acceptable time frame by means of a conventional distillation, in which the reaction mixture comprising the polymer (SP) and the carbamatosilane (CS) is stirred in a laboratory flask or production tank. This is the case even when the distillation is carried out at high liquid-phase temperatures with very good vacuum. At the same time the problem exists that high liquid-phase temperatures lead to unwanted secondary reactions, such as to discoloration and/or to partial degradation of the polymer (SP).

All the more surprising was the discovery that by the process of the invention the carbamatosilane (CS) can be removed readily from the reaction mixture in the evaporator unit used in the invention, even under surprisingly mild conditions.

Examples of radicals R are alkyl radicals, such as the methyl, ethyl, n-propyl, isopropyl, 1-n-butyl, 2-n-butyl, isobutyl, tert-butyl, n-pentyl, isopentyl, neopentyl, tert-pentyl radical; hexyl radicals, such as the n-hexyl radical; heptyl radicals, such as the n-heptyl radical; octyl radicals, such as the n-octyl radical, isooctyl radicals, and the 2,2,4-trimethylpentyl radical; nonyl radicals, such as the n-nonyl radical; decyl radicals, such as the n-decyl radical; dodecyl radicals, such as the n-dodecyl radical; octadecyl radicals, such as the n-octadecyl radical; cycloalkyl radicals, such as the cyclopentyl, cyclohexyl, cycloheptyl radical and methylcyclohexyl radicals; alkenyl radicals, such as the vinyl, 1-propenyl and the 2-propenyl radical; aryl radicals, such as the phenyl, naphthyl, anthryl and phenanthryl radical; alkaryl radicals, such as o-, m-, and p-tolyl radicals; xylyl radicals and ethylphenyl radicals; and aralkyl radicals, such as benzyl radical, the α- and the β-phenylethyl radical.

Examples of substituted radicals R are haloalkyl radicals, such as the 3,3,3-trifluoro-n-propyl radical, the 2,2,2,2',2',2'-hexafluoroisopropyl radical, and the heptafluoroisopropyl radical, and haloaryl radicals, such as the o-, m-, and p-chlorophenyl radical.

Radical R preferably comprises monovalent hydrocarbon radicals optionally substituted by halogen atoms and having 1 to 6 carbon atoms, more preferably alkyl radicals having 1 or 2 carbon atoms, more particularly the methyl radical.

Examples of radicals $R^1$ are hydrogen atom, the radicals specified for R, and also optionally substituted hydrocarbon radicals bonded to the carbon atom via nitrogen, phosphorus, oxygen, sulfur, carbon, or carbonyl group.

Radical $R^1$ preferably comprises hydrogen atom or hydrocarbon radicals having 1 to 20 carbon atoms, more particularly hydrogen atoms.

Examples of radical $R^2$ are hydrogen atoms or the examples specified for radical R.

Radical $R^2$ preferably comprises hydrogen atom or alkyl radicals optionally substituted by halogen atoms and having 1 to 10 carbon atoms, more preferably alkyl radicals having 1 to 4 carbon atoms, particularly the methyl or ethyl radical.

Examples of radical $R^3$ are methyl, ethyl, n-propyl or isopropyl radicals.

Radical $R^3$ preferably comprises the methyl or ethyl radical, more preferably the methyl radical.

So far as is possible, it is advantageous if the radicals $R^2$ and $R^3$ are identical, since otherwise an exchange of the alkoxy groups on the alkoxysilane groups represented in formula (I) cannot be ruled out. Identical radicals $R^2$ and $R^3$ are therefore one preferred embodiment of the invention.

The radicals Y preferably have number-average molar masses $M_n$ of at least 200 g/mol, more preferably of at least 500 g/mol, more particularly of at least 1000 g/mol. The radicals Y preferably have number-average molar masses $M_n$ of at most 40 000 g/mol, more particularly of at most 25 000 g/mol, more particularly of at most 20 000 g/mol.

The number-average molar mass $M_n$ here is determined in the context of the present invention by means of size exclusion chromatography (SEC) against polystyrene standard, in THF, at 60° C., flow rate 1.2 ml/min and detection by RI (refractive index detector) on a Styragel HR3-HR4-HR5-HR5 column set from Waters Corp. USA, with an injection volume of 100 μl.

Examples of polymer radical Y are organic polymer radicals whose number-average molecular mass is 200 to 40 000 g/mol and whose polymer chain comprises polyoxyalkylenes, such as polyoxyethylene, polyoxypropylene, polyoxybutylene, polyoxytetramethylene, polyoxyethylene-polyoxypropylene copolymer, and polyoxypropylene-polyoxybutylene copolymer; hydrocarbon polymers, such as polyisobutylene and copolymers of polyisobutylene with isoprene; polychloroprenes; polyisoprenes; polyurethanes; polyester; polyamides; polyacrylates; polymethacrylates; vinyl polymer or polycarbonates.

The polymer radical Y preferably comprises polyester, polyether, polyurethane, polyalkylene or polyacrylate radicals, more preferably polyurethane radicals, polyester radicals or polyoxyalkylene radicals, more particularly polyoxypropylene radicals, with the proviso that their number-average molecular mass is 200 to 40 000 g/mol, especially preferably 6000 to 22 000 g/mol.

The structure of the polymers (OHP) of the use in the invention is evident from the possible and also preferred definitions described above for the radicals Y. The polymers (OHP) to be used are preferably polyurethanes or polyethers, preferably having a viscosity of 10 to 1 000 000 mPas, more preferably of 1000 to 300 000 mPas. Especially preferred are polypropylene glycols, preferably having a viscosity of 1000 to 40 000 mPas.

In the context of the present invention, the viscosity is determined after conditioning to 23° C. with a DV 3 P rotational viscometer from A. Paar (Brookfield systems), using spindle 5 at 2.5 rpm in accordance with ISO 2555.

The polymers (OHP) for use in the invention are commercially customary products and/or may be prepared by methods which are common in polymer chemistry.

The isocyanate-functional silanes (IS) used in the invention are preferably $OCN(CH_2)_3$—$Si(OCH_3)_3$, $OCN(CH_2)_3$—$Si(OC_2H_5)_3$, $OCN(CH_2)_3$—$Si(OCH_3)_2CH_3$, $OCN(CH_2)_3$—$Si(OC_2H_5)_2CH_3$, $OCN(CH_2)$—$Si(OCH_3)_3$, $OCN(CH_2)$—$Si(OC_2H_5)_3$, $OCN(CH_2)$—$Si(OCH_3)_2CH_3$ or $OCN(CH_2)$—$Si(OC_2H_5)_2CH_3$, with particular preference being given to $OCN(CH_2)_3$—$Si(OCH_3)_3$ or $OCN(CH_2)$—$Si(OCH_3)_2CH_3$.

The silanes (IS) used in the invention are commercially customary products and/or may be prepared by methods common in chemistry.

In the $1^{st}$ process step the isocyanatosilane (IS) is used preferably in an amount such that there are at least 1.10, more preferably at least 1.15, isocyanate groups in the compounds (IS) to each hydroxyl group of the polymer (OHP).

The $1^{st}$ and $2^{nd}$ process steps are carried out preferably in the presence of a catalyst (K). It is possible here to use all catalysts which have also been used to date for the catalysis of isocyanates with alcohols.

Preferred examples of the catalysts (K) optionally used in the invention are bismuth-containing catalysts such as bismuth carboxylates such as bismuth 2-ethylhexanoate, bismuth neodecanoate or bismuth tetramethylheptanedionate, catalysts which as well as bismuth include other metals, especially mixed bismuth-zinc catalysts, tin-containing catalysts such as dioctyltin dilaurate, and dioctyl tin oxide, dioctyltin bis(acetylacetonate), dibutyltin dilaurate, dibutyltin oxide, dibutyltin bis acetylacetonate, zirconium-containing catalysts such as zirconium acetylacetonates, iron-containing catalysts such as iron acetylacetonate, and also the acetylacetonates of other metals.

The catalysts (K) used optionally in the invention more preferably comprise carboxylates of bismuth, with particular preference being given to bismuth 2-ethylhexanoate, bismuth neodecanoate or mixtures thereof.

Examples of commercially available catalysts (K) are Borchi® Kat 22, Borchi® Kat VP 0243, Borchi® Kat VP 0244 or OMG 315 (all OMG-Borchers), Bi neodecanoate from the companies Chemos or American Elements, Reaxis MSA 70 or Reaxis C 719 from Reaxis, BICAT® catalysts (The Shepherd Chemical Company, USA), and K-Kat® K-348 (KING INDUSTRIES, INC., USA).

In the $1^{st}$ and $2^{nd}$ process steps of the invention, catalysts (K) are used in amounts of preferably 1 to 1000 ppm by weight, more preferably 20 to 600 ppm by weight, more particularly 60 to 400 ppm by weight. The ppm by weight figure here describes 1 part by weight of catalyst (K) per 1 000 000 parts by weight of reaction mixture. If the $1^{st}$ and $2^{nd}$ process steps are carried out in the presence of catalysts (K), said catalysts are added preferably during the $1^{st}$ process step. In the $2^{nd}$ process step there is preferably no further addition of catalyst, since the catalyst (K) added in the $1^{st}$ process step is able to catalyze both process steps.

The components used in the process of the invention may in each case comprise one kind of such a component or else a mixture of at least kinds of such a component.

The $1^{st}$ process step of the invention is carried out preferably at temperatures between 20° C. and 180° C., more preferably between 40° C. and 150° C., more particularly between 50° C. and 120° C.

The $2^{nd}$ process step of the invention is carried out preferably at temperatures between 20° C. and 160° C., more preferably between 30° C. and 130° C., more particularly between 40° C. and 100° C.

The 1$^{st}$ and 2$^{nd}$ process steps of the invention are carried out independently of one another preferably under a pressure of 100 to 2000 hPa, more preferably at 900 to 1100 hPa.

In the 2$^{nd}$ process step the alcohol (A) of the formula (IV) is used preferably in an amount such that there are at least 1.20, more preferably at least 1.5, especially preferably at least 1.8 hydroxyl groups in the alcohol (A) to each isocyanate group remaining after the 1$^{st}$ process step.

In this context it is not necessary to determine the isocyanate group content analytically before the 2$^{nd}$ process step. It is easier to calculate the amount of remaining isocyanate groups from the excess of isocyanate-functional silanes (IS) of the formula (III) used in the 1$^{st}$ process step. The amounts for use of the alcohol (A) in the second process step that are stated above as being preferred, more preferred, and more particularly preferred preferably relate to these calculated amounts of isocyanate groups.

During the 3$^{rd}$ process step of the invention, the reaction mixture is exposed in the evaporator unit (VD) to a pressure preferably of at most 20 mbar, more preferably of at most 10 mbar, more particularly of at most 5 mbar.

During the 3$^{rd}$ process step of the invention, the reaction mixture is exposed in the evaporator unit (VD) to a temperature preferably of at most 180° C., more preferably of at most 160° C., more particularly of at most 140° C.

The 3$^{rd}$ process step of the invention is preferably carried out such that in the evaporation unit (VD) the reaction mixture has a mean residence time of at most 20 minutes, more preferably of at most 10 minutes, especially preferably of at most 5 minutes.

All of the process steps of the invention are carried out preferably under inert gas atmosphere, more preferably argon or nitrogen.

The process of the invention may of course also have further process steps as well as the process steps 1 to 3 of the invention, it being possible for such further process steps also to be carried out, in principle, between process steps 1 to 3. Preferably, however, the process of the invention has no further process steps other than the 1$^{st}$ to 3$^{rd}$ process steps of the invention.

The process of the invention can be carried out continuously, for example by conducting the 1$^{st}$ and 2$^{nd}$ process steps in each case in one or more tubular reactors or loop reactors, in serial cascades of two or more stirred reactors, or else only in each case in one stirred reactor, to which new reactants are supplied continuously, while at the same time reaction mixture is continually withdrawn. Combinations of two or more types of reactor are also conceivable. In this context the 2$^{nd}$ reaction step may also take place in an unstirred reactor or (intermediate) tank, provided the necessary mixing of all the raw materials needed for this step has taken place beforehand in a suitable mixing unit.

In the 1$^{st}$ reaction step, the compounds (OHP) and (IS) and any catalyst (K) are preferably metered jointly and are mixed before or in the reactor unit used in each case. The reaction mixture obtained is then, in the 2$^{nd}$ reaction step, admixed with the alcohol (A), likewise, again, before or in the reactor unit used in each case. A further addition of catalyst (K) is possible but not preferred, since the catalyst used in the 1$^{st}$ process step can be used to catalyze the 2$^{nd}$ process step.

The 3$^{rd}$ reaction step of the invention is then carried out, preferably likewise continuously, in the evaporation unit (VD). Here it may be useful if the plant for carrying out the process of the invention possesses a buffer tank, from which the reaction mixture is metered at a constant rate into the particular evaporator unit (VD) used. It is of course also possible to carry out the 3$^{rd}$ process step separately, in terms of time and/or location, from the first two process steps.

The process of the invention may also be carried out batchwise, in a stirred reactor, for example, in which first of all in the 1$^{st}$ process step the components (OHP) and (IS) are reacted with one another, optionally in the presence of catalyst (K), and subsequently in the 2$^{nd}$ process step alcohol (A) is metered in. A further metering of a catalyst (K) in the 2$^{nd}$ process step, though possible, is not preferred.

One variant of the batchwise process of the invention may also envisage the implementation of the 1$^{st}$ process step in a first reactor, such as a stirred tank, and the implementation of the 2$^{nd}$ process step in a second reactor. As for the continuous process, this second reactor need not necessarily be stirred, if the respective reactants have been mixed thoroughly beforehand in a separate mixing unit. Here as well, therefore, an (intermediate) tank may serve as a reactor for the second reaction step.

Even in the event of a batchwise implementation of the first two process steps, the 3$^{rd}$ process step of the invention is carried out preferably continuously in an evaporator unit (VD). In this case the reaction mixture is metered into the particular evaporator unit (VD) used preferably from an intermediate tank or buffer tank, preferably at a constant rate. In this case as well it is of course possible to carry out the 3$^{rd}$ process step separately, in terms of time and/or location, from the first two process steps.

If the reaction mixture obtained in a 2$^{nd}$ process step still contains alcohol (A), the latter is removed from the reaction mixture largely or even completely together with the carbamatosilane (CS) of the formula (V) in the 3$^{rd}$ process step. After the 3$^{rd}$ process step, therefore, the reaction mixture of the invention contains preferably at most 3 wt %, more preferably at most 0.1 wt %, more particularly at most 0.05 wt % of alcohol (A), based in each case on the total weight of the reaction mixture.

The catalyst (K), where used, remains preferably in the reaction mixture. After the 3$^{rd}$ process step there is preferably no longer any further workup of the reaction mixture.

An advantage of the process of the invention is that it is quick and easy to implement, and readily available raw materials can be used as reactants.

An advantage of the process of the invention is that the polymer mixture obtained is free from toxicological isocyanatosilanes.

An advantage of the process of the invention is that the polymer mixture obtained is free from or very low in monomeric carbamatosilanes (CS), which can influence the mechanical properties of the adhesives, sealants or coating materials producible from this polymer mixture.

Furthermore, the process of the invention possesses the advantage that the silane-crosslinkable polymers prepared accordingly are comparatively storage-stable and react only very slowly with atmospheric moisture in the absence of addition of an additional curing catalyst. This fact facilitates not only the storage of the polymers but also their further processing.

It is a further advantage of the process of the invention that the polymers prepared can be further used directly, in the production of crosslinkable materials, for example.

The silane-terminated polymers prepared in the invention can be used wherever silane-terminated polymers have been used to date.

In particular they are suitable for use in crosslinkable materials, more particularly in room temperature-curable adhesives and sealants, and also in coatings. The production of silane-crosslinking coatings, adhesives and sealants from such polymers has already been widely described in the literature, as for example in EP-A 1535940 A (paragraph [0032]-[0054] and also examples 5-7), WO 13079330 A2 (page 27, line 10 to page 40, line 7 and also examples 3-7, 9 and 10), WO 13026654 A1 (page 17, line 28 to page 37, line 24 and also examples 1-9) or WO 11131506 A1 (page 10, line 9 to page 18, line 34 and also examples 1-3). The moisture-curing formulations based on silane-terminated polymers that are described in these documents, the further ingredients employed in this context, and also the processes described therein for producing such formulations are likewise considered part of the disclosure content of this description, such as the applications described therein for the fully formulated coatings, adhesives and sealants.

In the examples described below, all viscosity figures relate to a temperature of 20° C. Unless indicated otherwise, the examples below are carried out under the pressure of the ambient atmosphere, in other words at about 1000 hPa, and at room temperature, in other words at about 20° C., or at a temperature which comes about when the reactants are combined at room temperature without additional heating or cooling.

Example 1A: Preparation of a Polypropylene Glycol Having Trimethoxysilylpropyl End Groups and an Average Molar Mass of 12 000 g/mol A 500 ml reaction vessel with stirring, cooling and heating means is charged with 400.0 g (33.33 mmol) of a hydroxy-terminated polypropylene glycol having an average molar mass $M_n$ of 12 000 g/mol (available commercially under the name Acclaim 12200 from Covestro AG, Leverkusen (DE)) and this initial charge is dried with stirring at 80° C. and 1 mbar for 2 h. Thereafter the vacuum is broken with nitrogen. The entire subsequent reaction is carried out under a nitrogen inert gas atmosphere.

To carry out the silane termination, the dried polyether is admixed at 80° C. first with 16.42 g (80.00 mmol) of isocyanatopropyltrimethoxysilane (available commercially under the name GENIOSIL® GF40 from Wacker Chemie AG, Munich (DE)) and then with 0.62 g of Borchi catalyst 315 (a catalyst containing bismuth neodecanoate, from Borchers), using an Eppendorf pipette. This corresponds to a value of 150 ppm by weight of catalyst, based on the total weight of the reaction mixture. Directly after the addition of catalyst, the reaction mixture heats up to 83-84° C. Thereafter it is stirred at a temperature of 80° C.

After 60 min, the reaction mixture is cooled to 60° C., and 0.64 g (20.00 mmol) of methanol is added. This is followed by stirring for 30 min more. Thereafter a sample of the reaction mixture is taken and is studied by IR analysis for any residues of isocyanatosilane still present. The sample is isocyanate-free.

Finally, the sample is passed at a metering rate of 160 g/h through a short-path evaporator with Teflon wipers and an internal cooling coil. The short-path evaporator has a diameter of 8 cm and a length of 26 cm. The wall temperature of the short-path evaporator is 130° C. and the applied pressure is 1 mbar. The end product is collected in the liquid-phase drain of the short-path evaporator. At 411 g, the yield is virtually quantitative.

Example 1B: Preparation of a Plypropylene Glycol Having Trimethoxysilylpropyl End Groups and an Average Molar Mass of 12 000 g/mol The procedure is as in example 1a, with the following amendments being made:

Between 2$^{nd}$ process step (reaction with methanol) and 3$^{rd}$ process step (thin-film treatment), a sample of 50 g is taken from the reaction mixture.

During the subsequent thin-film step on the remaining reaction mixture, the short-path evaporator is operated with a wall temperature of 110° C.

Comparative Example 1c(V): Preparation of a Polypropylene Glycol Having Trimethoxysilylpropyl End Groups and an Average Molar Mass of 12 000 g/mol This is the 50 g sample taken from the reaction mixture in example 1b before the final thin-film step.

Comparative Example 1d(V): Preparation of a Polypropylene Glycol Having Trimethoxysilylpropyl End Groups and an Average Molar Mass of 12 000 g/mol The procedure is as in example 1a, with the following amendments being made:

Instead of the last thin-film step, a batch distillation is carried out. For this purpose, the reaction flask in which process steps 1 and 2 have been carried out is provided with a Claisen condenser. Thereafter the pressure is reduced to 1 mbar and the reaction mixture is heated to 130° C. The vacuum distillation is carried out for a period of 1 h with intense stirring of the reaction mixture, after which a sample is taken.

Thereafter the vacuum distillation is continued for a further hour, and again a sample is taken.

Comparative Example 1e(V): Preparation of a Polypropylene Glycol Having Trimethoxysilylpropyl End Groups and an Average Molar Mass of 12 000 g/mol The procedure is as in example 1d(V), with the following amendments being made:

The vacuum distillation is carried out at a temperature of 160° C. instead of 130° C.

Example 2: Determination of Properties of the Polymer Mixtures Obtained

Viscosities are determined by the method described in the description.

Hazen color numbers are determined in accordance with ISO 6271, Part 2.

The carbamatosilane (N-(3-trimethoxysilylpropyl)-O-methylcarbamate) content is determined via a GC headspace method. This method is complicated by two problems:

1. Because the carbamatosilane content is very small and is heavily dependent on the composition of the matrix, it is uncertain whether a uniform calibration plot can be used for all samples.
2. For the production of a calibration plot there is "blank sample" (i.e., a sample entirely without carbamatosilane), since small amounts of carbamatosilane are formed as a secondary product, even without addition of methanol, during the first synthesis step itself (i.e., during the reaction of polymer with isocyanatosilane).

In a method which has proven appropriate, therefore, three 50 g samples are taken from each polymer mixture to be analyzed; of these three samples, one remains unchanged, one is admixed with 0.30 wt % of carbamatosilane, and one with 0.60 wt % of carbamatosilane. When these three samples are subsequently measured by headspace GC, integration of the respective carbamatosilane peaks yields three equations with two unknowns (A1=x*c; A2=x*(c+0.3); A3=x*(c+0.6), wherein A1, A2 and A3 are the integrated peak areas, x is the proportionality factor, and c is the target concentration of carbamatosilane). The carbamatosilane peak here is easy to perceive, since it is the only peak significantly differentiating the GC spectra of the three samples.

Since even two equations with two unknowns can be solved mathematically, it is possible here, as a result of the different combination possibilities, to compute three solutions for the concentration c. These three solutions must of course lead to the same result within the bounds of measurement accuracy, i.e., with an error tolerance for the carbamatosilane content that is ±10% of the respective measurement value. If this should not be the case, the measurement must be repeated.

NB: Because the precise metering, described above, of such small amounts of carbamatosilane is not easy in practice, it is also possible to operate with a slightly different metered amount. This difference must merely be noted, and the exact value metered must be entered into the corresponding equation. If, in other words, for example, instead of the intended 0.30 wt %, 0.32 wt % was accidentally metered, the measurement can be continued nevertheless. In the final calculation, however, the corresponding equation must then read A2=x*(c+0.32).

In order to implement the headspace measurement, a 0.5 g sample is weighed out into a 20 ml headspace vial, with the vial being blown out cautiously with nitrogen for around 30 s before being closed. The vial is subsequently heated at 150° C. for 30 min, after which the gas mixture above the sample is passed directly into the GC via a hot transfer capillary at 170° C. Duplicate determinations are carried out in each case for all of the samples.

With the polymer mixtures prepared in examples 1a to 1e, the following results are obtained, set out in table 1.

TABLE 1

| Example | 1a | 1b | 1c(V) | 1d(V) 1 h* | 1d(V) 2 h* | 1e(V) 1 h* | 1e(V) 2 h* |
|---|---|---|---|---|---|---|---|
| Temperature in step 3 [° C.] | 130 | 110 | — | 130 | 130 | 160 | 160 |
| Viscosity [Pas] | 7.3 | 7.2 | 7.1 | 7.2 | 7.1 | 7.3 | 7.5 |
| Color number Hazen | 18 | 17 | 17 | 31 | 42 | 88 | 102 |
| Carbamatosilane contents [wt %] | 0.011 | 0.024 | 0.70 | 0.68 | 0.64 | 0.50 | 0.41 |

*The examples labelled "1 h" describe the sample after a distillation time of 1 h, and the examples labelled "2 h" describe the sample after a distillation time of 2 h.

Example 3: Preparation of a Polypropylene Glycol Having Trimethoxysilylpropyl End Groups and an Average Molar Mass of 18 000 g/mol The procedure is as in example 1 b, with the following amendments being made:

- Instead of 400.0 g of a hydroxy-terminated polypropylene glycol having an average molar mass $M_n$ of 12 000 g/Mol, 400.0 g (22.22 mmol) of a hydroxy-terminated polypropylene glycol having an average molar mass $M_n$ of 18 000 g/mol (available commercially under the name of Acclaim 18200 from Covestro AG, Leverkusen (DE)) are used.
- Instead of 16.42 g (80.00 mmol) of isocyanatopropyltrimethoxysilane, 10.95 g (53.33 mmol) of the same isocyanatosilane are added dropwise.
- Instead of 0.64 g (20.00 mmol) of methanol, only 0.43 g (13.33 mmol) of methanol is used.
- After the end of the 2$^{nd}$ process step (i.e., reaction with methanol), a 50 gram sample ("sample 1") is taken.
- The remaining amount of product is subjected, as described in example 1 b, to the 3$^{rd}$ process step (thin-film treatment at 110° C.). The product obtained in that step is referred to as "sample 2".
- All other parameters remain unchanged.

Example 4: Determination of Properties of the Polymer Mixtures Obtained

Viscosities, Hazen color numbers, and carbamatosilane (N-(3-trimethoxysilylpropyl)-O-methylcarbamate) contents are also determined as described in example 2.

With the samples generated in example 3, the following results are obtained, set out in table 2.

TABLE 2

| Example 3 | Sample 1 (comparative) | Sample 2 |
|---|---|---|
| Temperature in step 3 [° C.] | — | 110 |
| Viscosity [Pas] | 26.3 | 26.5 |
| Color number, Hazen | 13 | 13 |
| Carbamatosilane content [wt %] | 0.49 | 0.039 |

Example 5: Preparation of a Polypropylene Glycol Having Alpha-Methyldimethoxysilylmethyl End Groups and an Average Molar Mass of 12 000 g/mol The procedure is as in example 1a, with the following amendments being made:

- Instead of 16.42 g (80.00 mmol) of isocyanatopropyltrimethoxysilane, 12.90 g (80.00 mmol) of alpha-isocyanatomethylmethyldimethoxysilane (available commercially under the name GENIOSIL® XL 42 from Wacker Chemie AG, Munich (DE)) are used.
- After the end of the 2$^{nd}$ process step (i.e., reaction with methanol), a 50 gram sample ("sample 1") is taken.
- The remaining amount of product is subjected, as described in example 1a, to the 3$^{rd}$ process step (thin-film treatment), with the short-path evaporator operated with a wall temperature of 90° C. The product obtained in that step is referred to as "sample 2".
- All other parameters remain unchanged.

Example 6: Determination of Properties of the Polyer Mixtures Obtained

Viscosities and Hazen color numbers of the samples from example 5 are also determined as described in example 2. The alpha-N-(methyldimethoxysilylmethyl)-O-methylcarbamate content is determined in an equivalent way to the determination for carbamatosilanes that is described in example 2. The only difference lies in the fact that, of course, the headspace GC peak analyzed is that for the carbamatosilane to be determined here.

With the samples generated in example 5, the following results are obtained, set out in table 3.

TABLE 3

| Example 5 | Sample 1 (comparative) | Sample 2 |
|---|---|---|
| Temperature in step 3 [° C.] | — | 90 |
| Viscosity [Pas] | 7.1 | 7.1 |
| Color number, Hazen | 8 | 8 |
| Carbamatosilane content [wt %] | 0.59 | 0.057 |

Example 7: Preparation of a Polypropylene Glycol Having Alpha-Methyldimethoxysilylmethyl End Groups and an Average Molar Mass of 18 000 g/mol The procedure is as in example 5, with the following amendments being made:

Instead of 400.0 g of a hydroxy-terminated polypropylene glycol having an average molar mass $M_n$ of 12 000 g/Mol, 400.0 g (22.22 mmol) of a hydroxy-terminated polypropylene glycol having an average molar mass $M_n$ of 18 000 g/mol (available commercially under the name of Acclaim 18200 from Covestro AG, Leverkusen (DE)) are used.

Instead of 12.90 g (80.00 mmol) of alpha-isocyanatomethylmethyldimethoxysilane, 8.60 g (53.33 mmol) of the same isocyanatosilane are added dropwise.

Instead of 0.64 g (20.00 mmol) of methanol, only 0.43 g (13.33 mmol) of methanol is used.

As in example 5, here as well, after the end of the $2^{nd}$ process step (i.e., reaction with methanol), a 50 gram sample ("sample 1") is taken.

The remaining amount of product is subjected, as described in example 1b, to the $3^{rd}$ process step (thin-film treatment at 110° C.). The product obtained in that step is referred to as "sample 2".

All other parameters remain unchanged.

Example 8: Determination of Properties of the Polymer Mixtures Obtained

Viscosities, Hazen color numbers, and carbamatosilane (alpha-N-(methyldimethoxysilylmethyl)-O-methylcarbamate) contents are also determined as described in example 2.

With the samples generated in example 7, the following results are obtained, set out in table 4.

TABLE 4

| Example 7 | Sample 1 (comparative) | Sample 2 |
|---|---|---|
| Temperature in step 3 [° C.] | — | 110 |
| Viscosity [Pas] | 26.2 | 26.2 |
| Color number, Hazen | 9 | 9 |
| Carbamatosilane content [wt %] | 0.40 | 0.050 |

The invention claimed is:

1. A process for preparing silane-terminated polymers (SP) of the formula (I)

$$Y—[O—C(—O)—NH—(CR^1_2)_b—SiR_a(OR^2)_{3-a}]x \quad (I),$$

characterized in that in a $1^{st}$ process step at least one polymer (OHP) of the formula (II)

$$Y—[OH]_x \quad (II)$$

is reacted with at least one isocyanate-functional silane (IS) of the formula (III)

$$O=C=N—(CR^1_2)_b—SiR_a(OR^2)_{3-a} \quad (III)$$

with the proviso that the at least one isocyanate-functional silane (IS) is used in an amount such that there are at least 1.05 isocyanate groups in the at least one isocyanate-functional silane (IS) to each hydroxyl group in the at least one polymer (OHP), where Y is an x-valent polymer radical, R may be identical or different and is a monovalent, optionally substituted hydrocarbon radical, $R^1$ may be identical or different and is hydrogen atom or a monovalent, optionally substituted hydrocarbon radical, $R^2$ may be identical or different and is hydrogen atom or a monovalent, optionally substituted hydrocarbon radical, x is an integer from 1 to 50, a may be identical or different and is 0, 1 or 2, and b may be identical or different and is an integer from 1 to 10, subsequently in a $2^{nd}$ process step the unreacted isocyanate groups of the silanes (IS)" with "unreacted isocyanate groups of the at least one isocyanate-functional silane (IS) are reacted, in the reaction mixture obtained in the $1^{st}$ process step, with at least one alcohol (A) of the formula (IV)

$$R^3OH \quad (IV),$$

where $R^3$ is a hydrocarbon radical having 1 to 4 carbon atoms, and a carbamatosilane (CS) is formed, and subsequently in a $3^{rd}$ process step the reaction mixture obtained in the $2^{nd}$ process step is passed through an evaporation unit (VD) in which the reaction mixture in a layer thickness of not more than 5 cm is exposed to a pressure of at most 80 mbar and temperatures of at most 200° C., wherein the carbamatosilane (CS) formed in the $2^{nd}$ process step, of the formula (V)

$$R^{30}—C(=O)—NH—(CR^1_2)_b\text{-}SiR_a(OR^2)_{3-a} \quad (V),$$

in which all the variables have the definition stated above, is at least partly evaporated and removed.

2. The process as claimed in claim 1, wherein the carbamatosilane content in the reaction mixture obtained after the process of the invention is at most 0.3 wt %, based on the total weight of the reaction mixture.

3. The process as claimed in claim 1, wherein the carbamatosilane content in the reaction mixture obtained after the process of the invention is at most 0.1 wt %, based on the total weight of the reaction mixture.

4. The process as claimed in claim 1, wherein the isocyanatosilane (IS) is used in the $1^{st}$ process step in an amount such that there are at least 1.10 isocyanate groups in the compounds (IS) for each hydroxyl group of the polymer (OHP).

5. The process as claimed in claim 1, wherein the $1^{st}$ and $2^{nd}$ process steps are carried out in the presence of a catalyst (K).

6. The process as claimed in claim 1, wherein the $3^{rd}$ process step is carried out such that the reaction mixture has a mean residence time in the evaporation unit (VD) of at most 20 minutes.

7. The process as claimed in claim 1, wherein the reaction mixture during the 3rd process step in the evaporator unit (VD) is exposed to a temperature of at most 180° C.

8. The process as claimed in claim 1, wherein all the process steps are carried out under inert gas atmosphere.

* * * * *